United States Patent
Lara (10) Patent No.: US 9,509,237 B2
(45) Date of Patent: Nov. 29, 2016

(54) AC MOTOR WITH STATOR WINDING TAP AND METHODS FOR STARTING AN AC MOTOR WITH A VARIABLE SPEED DRIVE

(71) Applicant: TMEIC Corporation, Roanoke, VA (US)

(72) Inventor: Marcelo Andres Lara, Salem, VA (US)

(73) Assignee: TMEIC Corporation, Roanoke, VA (US)

( * ) Notice: Subject to any disclaimer, the term of this patent is extended or adjusted under 35 U.S.C. 154(b) by 385 days.

(21) Appl. No.: 14/270,897

(22) Filed: May 6, 2014

(65) Prior Publication Data
US 2015/0326165 A1 Nov. 12, 2015

(51) Int. Cl.
| | |
|---|---|
| H02P 1/04 | (2006.01) |
| H02P 1/26 | (2006.01) |
| H02P 25/18 | (2006.01) |
| H02P 1/52 | (2006.01) |
| H02K 3/28 | (2006.01) |
| H02K 17/14 | (2006.01) |

(52) U.S. Cl.
CPC . *H02P 1/26* (2013.01); *H02K 3/28* (2013.01); *H02K 17/14* (2013.01); *H02P 1/52* (2013.01); *H02P 25/188* (2013.01)

(58) Field of Classification Search
CPC .......... H02K 3/28; H02P 6/08; H02P 25/18; H02P 1/52
USPC ........................................................ 318/430
See application file for complete search history.

(56) References Cited

U.S. PATENT DOCUMENTS

| | | | | |
|---|---|---|---|---|
| 6,104,566 | A * | 8/2000 | Stephenson | G11B 19/28 360/73.01 |
| 8,471,426 | B2 | 6/2013 | Lang et al. | |
| 2004/0090196 | A1* | 5/2004 | Maslov | H02P 25/20 318/272 |
| 2006/0181238 | A1* | 8/2006 | Choi | H02P 25/04 318/786 |
| 2009/0115363 | A1* | 5/2009 | Crane | H02P 6/14 318/400.26 |
| 2011/0181226 | A1* | 7/2011 | Steiner | H02P 13/06 318/519 |
| 2014/0049152 | A1* | 2/2014 | Baldwin | H01J 21/20 313/306 |
| 2014/0300433 | A1* | 10/2014 | Shudarek | H02M 1/126 333/177 |

FOREIGN PATENT DOCUMENTS

| | | |
|---|---|---|
| EP | 1267473 B1 | 4/2011 |
| EP | 2341247 A | 7/2011 |

* cited by examiner

*Primary Examiner* — Eduardo Colon Santana
*Assistant Examiner* — Gabriel Agared
(74) *Attorney, Agent, or Firm* — New River Valley IP Law, P.C.; Michele L. Mayberry; Timothy D. Nolan (57) ABSTRACT

Methods for starting an AC motor with a variable speed drive and switching the motor to a higher voltage power source are described. Provided are AC motors with a stator having a plurality of coils, the plurality comprising a complete set of coils for each phase, the complete set comprising a first set of coils comprising first groups of coils connected in series, or parallel, or a combination, and a second set of coils comprising second groups of coils connected in series, or parallel, or a combination, wherein the output of a variable speed drive is connected to a tap on the complete set of coils such that the AC motor may be started with a variable speed drive, and an output of the power line is connected to the series of the first and second sets of coils.

18 Claims, 4 Drawing Sheets

AC MOTOR WITH STATOR WINDING TAP AND METHODS FOR STARTING AN AC MOTOR WITH A VARIABLE SPEED DRIVE

BACKGROUND OF THE INVENTION

Field of the Invention

The present disclosure relates to AC motors. More particularly, the present disclosure relates to systems comprising an AC motor configured to be started with a variable speed drive and then transferred to a higher voltage power system. An AC motor of this configuration, methods of manufacturing such an AC motor, and methods of operating such an AC motor are also embodiments of the invention.

Description of Related Art

Many industrial applications of AC motors require starting high load torques with minimal impact in the power system. Attempts to meet these demands have included reduced voltage soft starters, autotransformers, inductors, and combinations of inductor and capacitor starters, but these have the disadvantage of not providing the full motor torque capability at low speed. With the exception of reduced voltage soft starters, these solutions also introduce important transients in line currents and motor air-gap torque during the switching events. Various system and motor configurations exist but do not solve these issues, including U.S. Pat. No. 8,471,426, European Patent No. 2341247, and European Patent No. 1267473.

It has been found that use of a variable speed drive partially addresses these starting problems by changing the output frequency and voltage such that it is able to control the motor torque from zero to maximum speed. However, in some cases the maximum voltage available at the output of the variable speed drive is lower than the available system voltage. For the industrial applications described above, when the maximum output voltage of the variable speed drive is lower than the system nominal voltage, a step-up transformer is required between the variable speed drive output and the motor terminals. However, these step-up transformers take space and add an important installation and operating cost to the system. Thus, there is a need for improved methods and systems that overcome these limitations.

SUMMARY OF THE INVENTION

The present disclosure describes a system and method for (a) starting AC motors with variable speed drives that have a maximum output voltage lower than the motor rated voltage and (b) transferring operation of the motor to the higher voltage incoming line with a minimum transient by synchronizing the motor winding voltage with the power line. Systems and methods may accomplish this without using a transformer.

Embodiments of this disclosure use a connection of the stator winding coils to introduce a tap on each phase so the motor can be started with the variable speed drive. The motor rotating flux induces a higher voltage at the extremes of the stator windings with an amplitude and phase that can be controlled by the variable speed drive, so that once the motor is running at full speed it can be transferred to the power line with a minimum transient.

Included in aspects of the invention is an AC motor comprising:

(a) a wye connected stator lap winding with a set of coils per phase (also referred to in this specification as a complete set or an arrangement of coils per phase);

(b) each arrangement of coils comprises n subsets of coils wherein n is the number of poles on the stator;

(c) each subset of coils comprises a first group of coils connected to the first group of coils of another subset, forming a first set comprising the first groups of coils connected together (said another way, the first set comprises the first group of coils from each subset, which first groups of coils are connected together in series, or in parallel, or in series and in parallel, where each parallel branch has the same number of series connected coils;

(d) each subset of coils comprises a second group of coils connected to the second group of coils of another subset, forming a second set comprising the second groups of coils connected together (said another way, the second set comprises the second group of coils from each subset, which second groups of coils are connected together in series, or in parallel, or in series and in parallel, with the same number of parallel branches as the first set, and each branch with the same number of series connected coils;

(e) each subset of coils is configured such that the first and second groups of coils are symmetrically disposed relative to the center of the subset of coils;

(f) a first end of the second set is operably configured for connection with a power line;

(g) a second end of the second set is connected in series to a first end of the first set of coils;

(h) a second end of the first set is connected to the neutral point inside the motor;

(i) a tap is connected to a point where the first and second sets of coils are connected together (as described in point (g) above) and is operably configured for connection with a variable speed drive.

A variable speed drive connects to the tap of each complete set of coils (each arrangement of coils) corresponding to a phase and the power line connects to a second set of coils of each arrangement. Further, depending on the embodiment, the first groups of coils, as well as the second groups of coils, can be connected together in series, or in parallel, or in a combination of series and parallel provided each parallel branch has the same number of series connected coils, and both the have the same number of parallel branches. As used in the context of this disclosure, the terms "connect," "connection," "connected," and the like can refer to a direct connection between components or can refer to an indirect connection between components, meaning other structure may be intermediately disposed. For example, in embodiments, the variable speed drive can be connected directly to the first set of coils with no intermediate structure, or indirectly by way of an intermediate structure, such as an output inductor.

The first set comprises the first groups of coils connected together in series or parallel or in a combination of series and parallel, where each parallel branch has the same number of series connected coils, and the second set comprises the second groups of coils connected together in series or parallel or in a combination of series and parallel, with the same number of parallel branches as the first set, and each branch with the same number of series connected coils. A first group and a second group of coils together define a subset that defines a pole on each phase. The second group of coils will be geometrically located at the extremes or the center of the each subset which defines a pole on each phase, in such way that the winding function fundamental component of the arrangement of coils is in phase with the winding function fundamental component of the first set of coils. In embodiments, the second set of coils will be connected in series to the first set of coils for each set of coils corresponding to a phase (i.e., each "complete set of coils" or each "arrangement of coils" corresponding to a phase).

In an exemplary embodiment, a variable speed drive may be connected, optionally, through an output inductor, only to the first set of coils (at the tap) and can be used to accelerate the motor to the maximum speed. The variable speed drive may also provide a higher magnetizing (or flux) and torque producing current to properly compensate for the reduced number of turns of the first set of coils.

In an exemplary embodiment, a drive switching device is connected at the load side of the variable speed drive output inductor and its load side is connected to the first set of coils (at the tap). Further, in an exemplary embodiment, a line switching device is connected such that its line side is connected to the power system and its load side is connected to the motor terminals, the extreme of the first and second set series connection.

In an exemplary embodiment, the variable speed drive is configured to transfer the AC motor to the power line after the acceleration is completed such that it minimizes the switching transient by sensing the proper phase angle and amplitude of the voltage at the terminals of the variable speed drive and the power system to activate the line switching device to connect the motor to the power line and activate the drive switching device to disconnect the motor from the variable speed drive.

In embodiments, the variable speed drive is configured to transfer the AC motor from the power line to the variable speed drive for a controlled deceleration such that it minimizes the switching transient by first activating the line switching device to disconnect the motor from the power line and then sensing the proper phase angle and amplitude of the voltage induced at the terminals of the first set of coils to activate the drive switching device to connect the motor to the variable speed drive.

BRIEF DESCRIPTION OF THE DRAWINGS

The drawings illustrate certain aspects of embodiments of the present invention and should not be used to limit or define the invention. Together with the written description the drawings serve to explain certain principles of the invention.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

In the present disclosure, any of the following terms may be used in reference to the coils of the motor stator. For each phase there is an "arrangement" of coils which is also referred to as a complete set of coils for each phase. Each complete set of coils (e.g., arrangement of coils) is composed of n "subsets" (wherein n is the number of poles). Each subset comprises a "first group" of coils and a "second group" of coils. The first group and second group of coils have distinct configurations within the subset (as will be described in further detail and as shown in the figures). The first group of coils of each subset are connected together to create the "first set" of coils. These connections may be in series or in parallel or in a combination of series and parallel connections, where each parallel branch has the same number of series connected coils. The second group of coils of each subset are connected together to create the "second set" of coils. These connections may also be in series or in parallel or in a combination of series and parallel connections, with the same number of parallel branches as the first set, and each branch with the same number of series connected coils. Thus, each complete set of coils (or arrangement of coils) is composed of n subsets as well as a first set of coils and a second set of coils.

Motors and Systems

An exemplary embodiment of this disclosure is a system comprising a three phase AC motor with a stator, wherein the stator has a combination of a number of slots and number of poles configured to correspond to a three phase machine. The motor stator winding comprises a plurality of coils consisting of three complete sets of coils (three arrangements of coils) of the same configuration wherein each arrangement of coils corresponds to a phase of a three phase winding. Each of these arrangements of coils is further subdivided into a number of subsets according to the number of poles of the motor.

In embodiments, each subset of coils that define a pole of each phase is further divided in two groups, a first group and a second group. The first group of each subset is connected in series or in parallel or in a combination of series and parallel to the first group of the other subsets, where each parallel branch has the same number of series connected coils, for the arrangement of coils corresponding to a phase, to form a first set (of the corresponding phase) and the second group of each subset is connected in series or in parallel or in a combination of series and parallel to the second group of the other subsets to form a second set (of the corresponding phase), with the same number of parallel branches as the first set, and each branch with the same number of series connected coils. The first set, which comprises the first group of each subset connected together in series or parallel or a combination of series and parallel, where each parallel branch has the same number of series connected coils, is operably connected to a variable speed drive at the tap during starting. The second set, which comprises the second group of each subset connected together in series or parallel or a combination of series and parallel, with the same number of parallel branches as the first set, and each branch with the same number of series connected coils, is connected in series to the first set with one end connected to the first set and the other end defining a terminal that is capable of being connected, for example, to the power system.

In embodiments, the output of the variable speed drive is connected to the first set at the tap such that the AC motor may be started with the variable speed drive. During operation of the AC motor, for example at full speed, an output of the power line is connected to the first end of the second set to provide power to the motor to continue operating the motor without the variable speed drive.

In embodiments of the system, the power line and the variable speed drive each have a three phase output and the stator has a three phase winding.

Additionally, embodiments provide that the winding function fundamental component of the first set of coils is in phase with the winding function fundamental component of the arrangement of coils for each phase such that it provides a configuration that allows the AC motor to transition between the output of the variable speed drive and the higher voltage power system while maintaining approximately the same phase angle and amplitude of the flux at the moment of the transition.

In embodiments of the system, there is no intervening transformer between the output of the variable speed drive and the first set of coils.

In embodiments, the number of turns in series of the first set of coils is lower than the total number of turns in series of the arrangement of coils for each phase. This allows the first set of coils to receive a lower voltage.

The second set of coils will be selected in such way that the fundamental component of the winding function of the first set is in phase with the fundamental component of the winding function of the arrangement of coils for each phase. Selection in this way ensures that when the motor is transferred to the power line with the help of switching devices, no sudden change in the position of the rotating flux will be required, otherwise both the machine and the power system will be subject to important torque and current transients respectively.

In embodiments, the variable speed drive is configured to provide higher magnetizing and torque producing currents to compensate for the reduced number of turns connected in series of the first set of coils based on a factor defined by a ratio of the winding function fundamental component of the arrangement of coils for each phase and the winding function fundamental component of the first set of coils. Thus, the ratio of the fundamental components of the winding functions of the complete set of coils (i.e., the arrangement of coils) for each phase and the first set of coils will define the factor that will be used to calculate the magnetizing current that the variable speed drive will need to produce during starting. In embodiments, the rated magnetizing current and torque producing current are multiplied by that factor.

Figure 1A:
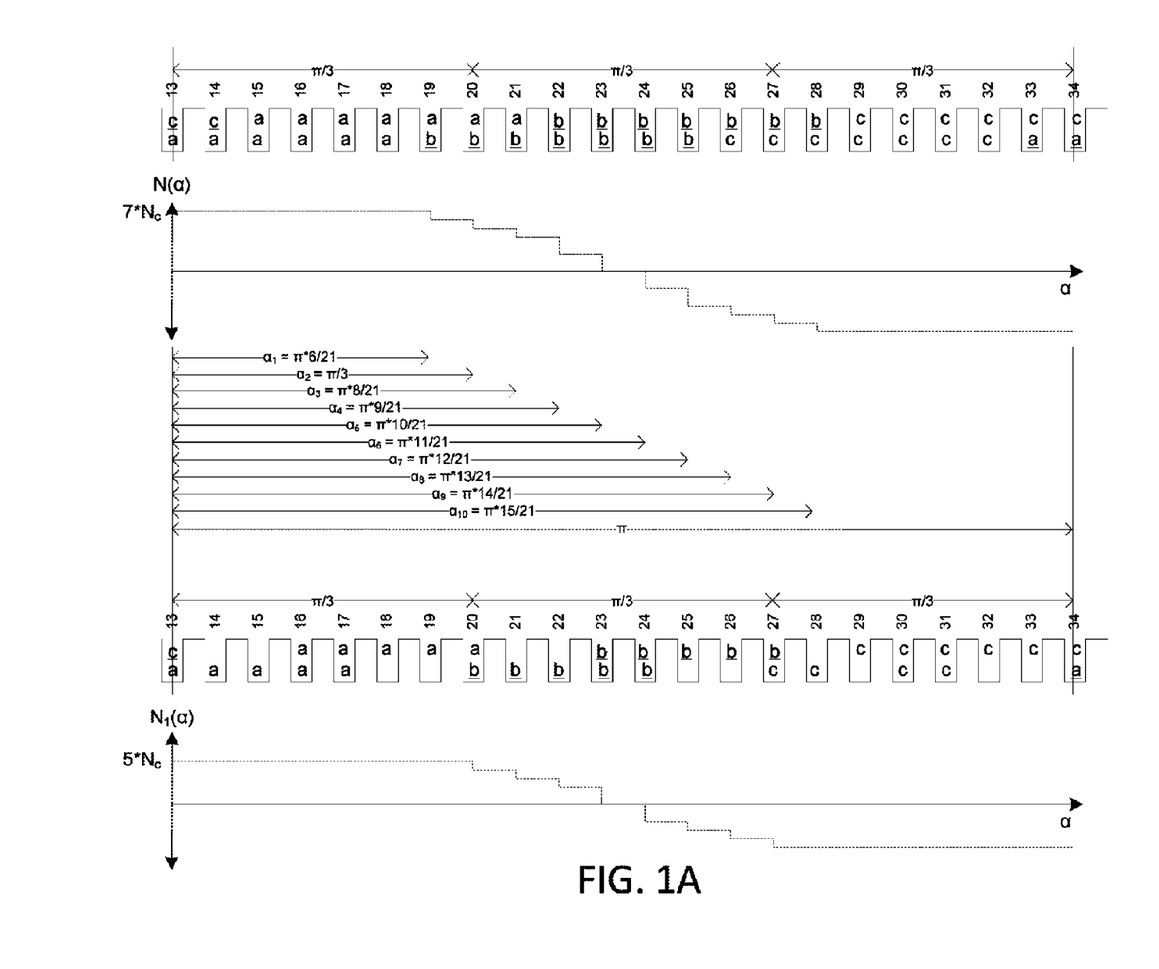
FIG. 1A is a schematic diagram of a portion of a three phase, four poles, AC motor with 84 stator slots with the corresponding stator coils in a lap configuration, showing $\pi$ radians (180 degrees) of Phase b Stator Winding Functions for the complete set of coils (arrangement of coils), $N(\alpha)$, and for the first set of coils, $N_1(\alpha)$, according to an exemplary embodiment of this disclosure.

The top part of FIG. 1A shows a portion of an 84 slot stator corresponding to a three phase, 4 pole machine and the position of the coils and the corresponding IF radians (180 degrees) of the phase b winding function $N(\alpha)$. FIG. 1A also includes the angles in radians of the slots where coils of the b phase are located. These angles are measured in radians considering slot 13 as the origin. The lower part of the figure shows just the first group of coils of the same section of the stator. The corresponding IF radians (180 degrees) winding function of phase b first set of coils, $N_1(\alpha)$, is included at the bottom of the figure. The coils with at least one part at the ends of the subsets correspond to the second set of coils and are not shown. The important point of this figure is the fact that the fundamental component of the winding function of the first set of coils is in phase with the winding function of the complete set of coils (otherwise referred to as the "arrangement of coils") for phase b. The same happens with the other poles and other phases.

Equation 1 below corresponds to the Fourier series coefficients of the complete set winding function $N(\alpha)$, which describes the amplitude of the complete set of coils winding function harmonic components.

Equation 1: Amplitude of the complete set of coils winding function harmonic components $$F_h = \frac{2}{\pi} \int_0^\pi N(\alpha) \cdot \cos(h \cdot \alpha) \cdot d\alpha$$

The particular case for the example shown in FIG. 1A is represented in Equation 2. The solutions to the integral shown in Equation 2 are represented in Equation 3, which also represents the amplitude of the arrangement of coils winding function harmonic components.

Equation 2: Amplitude of the arrangement of coils winding function harmonic components for the Example shown in FIG. 1A.

$$F_h = \frac{2}{\pi} \Bigg[ \int_0^{\alpha_1} q \cdot N_c \cdot \cos(h \cdot \alpha) \cdot d\alpha + \int_{\alpha_1}^{\alpha_2} (q-1) \cdot N_c \cdot \cos(h \cdot \alpha) \cdot d\alpha +$$
$$\int_{\alpha_2}^{\alpha_3} (q-2) \cdot N_c \cdot \cos(h \cdot \alpha) \cdot d\alpha + + \int_{\alpha_3}^{\alpha_4} (q-3) \cdot N_c \cdot \cos(h \cdot \alpha) \cdot d\alpha +$$
$$\int_{\alpha_4}^{\alpha_5} (q-5) \cdot N_c \cdot \cos(h \cdot \alpha) \cdot d\alpha +$$
$$\int_{\alpha_5}^{\alpha_6} (q-7) \cdot N_c \cdot \cos(h \cdot \alpha) \cdot d\alpha + + \int_{\alpha_6}^{\alpha_7} (q-9) \cdot N_c \cdot \cos(h \cdot \alpha) \cdot d\alpha +$$
$$\int_{\alpha_7}^{\alpha_8} (q-11) \cdot N_c \cdot \cos(h \cdot \alpha) \cdot d\alpha + \int_{\alpha_8}^{\alpha_9} (q-12) \cdot N_c \cdot \cos(h \cdot \alpha) \cdot d\alpha + +$$
$$\int_{\alpha_9}^{\alpha_{10}} (q-13) \cdot N_c \cdot \cos(h \cdot \alpha) \cdot d\alpha +$$
$$\int_{\alpha_{10}}^{\pi} (q-14) \cdot N_c \cdot \cos(h \cdot \alpha) \cdot d\alpha \Bigg]$$

Equation 3: Amplitude of the arrangement of coils winding function harmonic components $$F_h = \frac{2 \cdot N_c}{\pi \cdot h} [\sin(h \cdot \alpha_1) + \sin(h \cdot \alpha_2) + \sin(h \cdot \alpha_3) +$$
$$2 \cdot \{\sin(h \cdot \alpha_4) + \sin(h \cdot \alpha_5) + \sin(h \cdot \alpha_6) + \sin(h \cdot \alpha_7)\} + + \sin(h \cdot \alpha_8) +$$
$$\sin(h \cdot \alpha_9) + \sin(h \cdot \alpha_{10})]$$

where:

$F_h$ are the Fourier series coefficients of the winding function of the arrangement of coils; and h is the harmonic order component, $N_c$ is number of turns per coil, and q is the number of coils per pole per phase.

Equation 4 corresponds to the amplitude of the first set winding function harmonic components, which are obtained by calculating the Fourier series coefficients of the winding function $N_1(\alpha)$.

Equation 4: Amplitude of the first set of coils winding function harmonic components.

$$F_{1h} = \frac{2 \cdot N_c}{\pi \cdot h}[0 \cdot \sin(h \cdot \alpha_1) + \sin(h \cdot \alpha_2) + \sin(h \cdot \alpha_3) +$$

$$\sin(h \cdot \alpha_4) + 2 \cdot \{\sin(h \cdot \alpha_5) + \sin(h \cdot \alpha_6)\} + +\sin(h \cdot \alpha_7) +$$

$$\sin(h \cdot \alpha_8) + \sin(h \cdot \alpha_9) + 0 \cdot \sin(h + \alpha_{10})]$$

where:

$F_{1h}$ are the Fourier series coefficients of the winding function of the first set of coils; and h is the harmonic order component.

Because the complete subset, the first and second group of coils shown in FIG. 1A, are symmetrically distributed around the tooth between slots 23 and 24, the fundamental components of both winding functions, N(α) and N₁(α) are in phase. Note that the portion shown of the winding functions are symmetric with respect to the vertical axis drawn on slot 13. That is the reason why the solutions of the Fourier coefficient only have sine terms.

Equation 5 shows the ratio ($I_{d\_q\_mult}$) between the fundamental components of the arrangement of coils per phase and the first set winding functions. This is the ratio that must be used as multiplier for the magnetizing and torque producing currents.

Equation 5: Ratio between the amplitude of the arrangement of coils and first set of coils winding function fundamental components.

$$I_{d\_q\_mult} = \frac{F_1}{F_{1_1}}$$

Figure 1B:
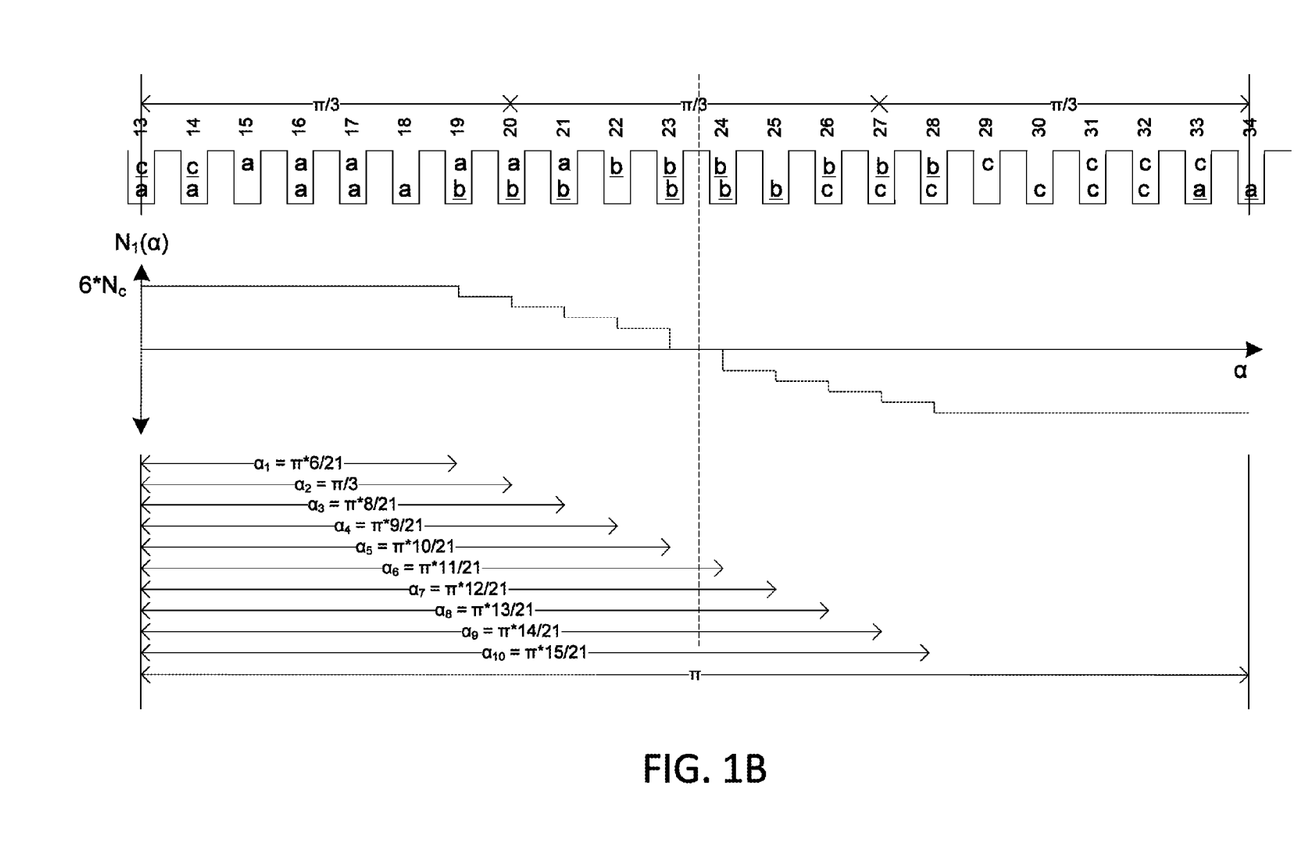
FIG. 1B is a schematic diagram of a portion of a three phase, four poles, AC motor with 84 stator slots with the corresponding stator coils in a lap configuration, showing $\pi$ radians (180 degrees) of Phase b Stator Winding Functions for the first group of coils, $N_1(\alpha)$, according to an exemplary embodiment of this disclosure. Only the coils at the center are part of the second group.

FIG. 1B is a schematic diagram showing π radians (180 degrees) of Phase b Stator Winding Functions for the first group of coils and depicts an embodiment of another possible configuration of the first and second groups of coils relative to one another. As shown in FIG. 1B, only the coils at the center are part of the second group.

In embodiments, the first group and the second group together define a subset of the set of coils, the subset representing a pole of a single phase such that a stator with n poles will have n subsets for a set of coils representing a single phase of the stator. Embodiments may further include configurations where n subsets for an arrangement of coils representing a single phase of the stator have a geometric configuration in which the first group of coils of each of the n subsets are connected together in series or parallel or in a combination of series and parallel to form the first set, where each parallel branch has the same number of series connected coils, and the second group of coils of each of the n subsets are connected together in series or parallel or in a combination of series and parallel to form the second set, with the same number of parallel branches as the first set, and each branch with the same number of series connected coils, and the first set is connected in series to the second set. Further, each subset may have a geometric configuration comprising a center portion and two outer portions. As used in the context of this disclosure, the terms "center," "central," "centrally disposed," and the like do not require that the components be arranged at an exact center and the term "between" is equally applicable in embodiments. In some embodiments, the center portion of the subset consists of the first group of coils and the two outer portions of the subset consist of the second group of coils. In other embodiments, the center portion of the subset consists of the second group of coils and the two outer portions of the subset consist of the first group of coils. However, in other embodiments other configurations are also possible.

Figure 2:
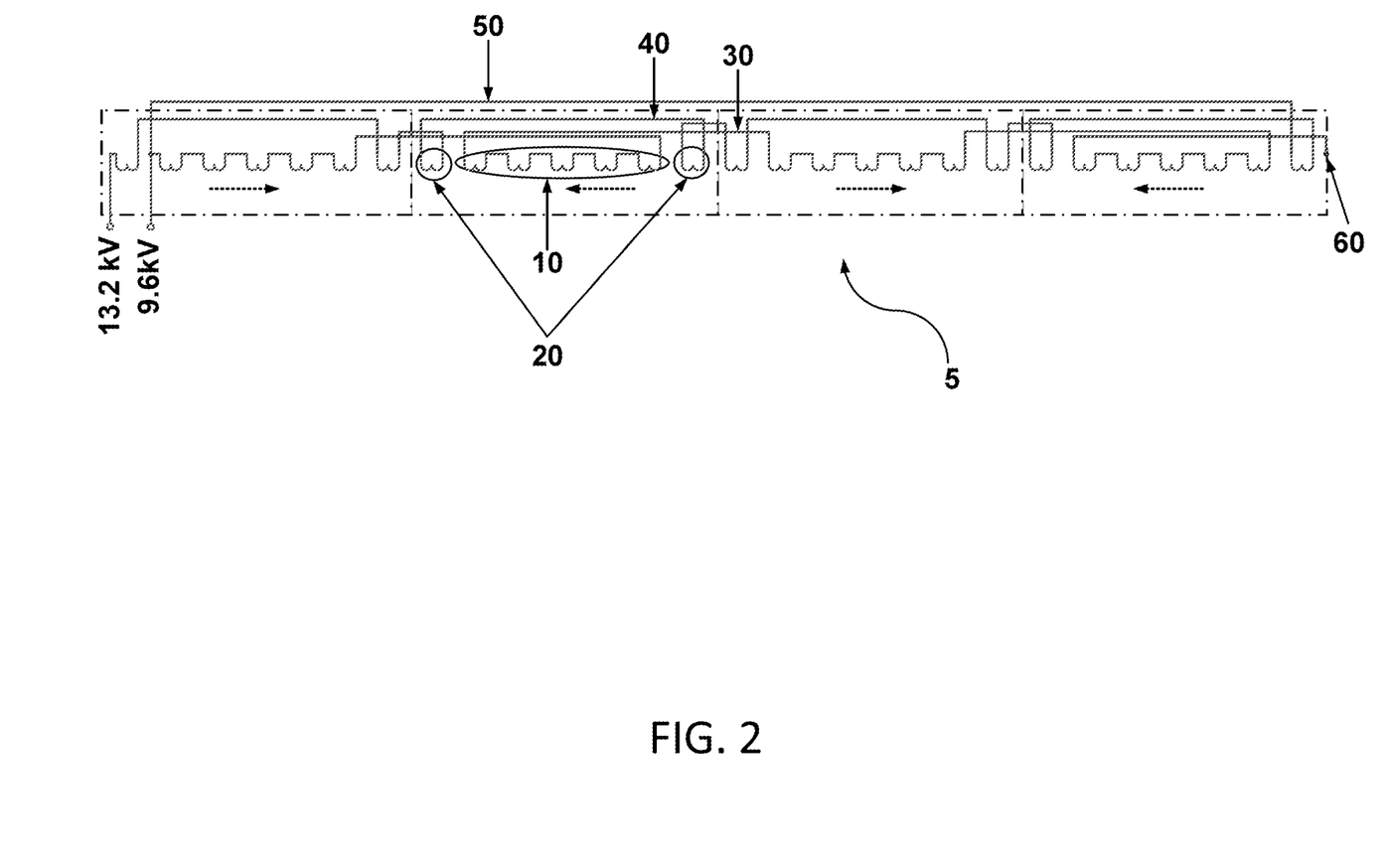
FIG. 2 is a schematic diagram of a three phase, four poles, AC motor with 84 stator slots showing the stator lap winding connection (each box corresponds to a subset of coils of one phase) according to an exemplary embodiment of this disclosure.

FIG. 2 shows an exemplary wiring configuration for an arrangement of coils 5 representing one phase. In this particular example (for a four pole, 84 slots stator) there are seven coils in each subset (each box composed of dashed lines defines a subset of coils of one phase; thus the figure shows four subsets representing four poles corresponding to one phase). A first group of coils 10 consists of the five coils located at the center of each subset and a second group 20 consists of two coils at the extremes of each subset. The first set is formed in part by line 30 which connects the first group of coils 10 of neighboring subsets together in series and the second set is formed in part by line 40 which connects the second group of coils 20 in series at the extremes of each subset. The first set of coils is fed by a phase of the 9.6 kV (line to line voltage) from the variable speed drive and the arrangement of coils will be fed by the same phase of the 13.2 kV (line to line voltage) power system, thereby showing how the tap is created. All the first groups of each subset are connected together in series and all the second groups of each subset are connected together in series, and the first set comprising a plurality of the first group of coils is connected to the second set comprising a plurality of the second group of coils through line 50. A neutral point is shown by reference number 60. The dashed arrows represent the direction of the current in each subset.

It should be stressed that the embodiment shown in FIG. 2 is merely exemplary, and other configurations of the coils are possible, such as having the first group of coils located at the extremes of each subset and the second group of coils located at the center. Additionally, configurations of the two groups of coils representing other combinations of poles and slots for the stator fall within the scope of the invention. In one embodiment of the system of this disclosure (shown in FIG. 2), the stator comprises four poles and 84 slots. In addition, the voltages listed are merely exemplary. Other voltages are possible, as long as the voltage in the input line connected to the second set of coils exceeds that of the input line connected to the first set of coils at the tap.

As stated above, this configuration maintains the winding function of the first set in phase with the winding function of the arrangement of coils for each phase. Thus, during operation and preferably once the motor has achieved maximum operating speed, when the motor is transferred to the power system from the variable speed drive, the fundamental component of the magnetic flux produced by the current injected by the drive will not change position during the transition to the power line.

In additional embodiments, the variable speed drive is connected to the first set of coils through an output inductor and is configured to accelerate the AC motor to maximum speed. Additional embodiments may include a drive switching device connected to the output inductor and the first set of coils, and a line switching device connected to the power line and the complete set of coils.

Figure 3:
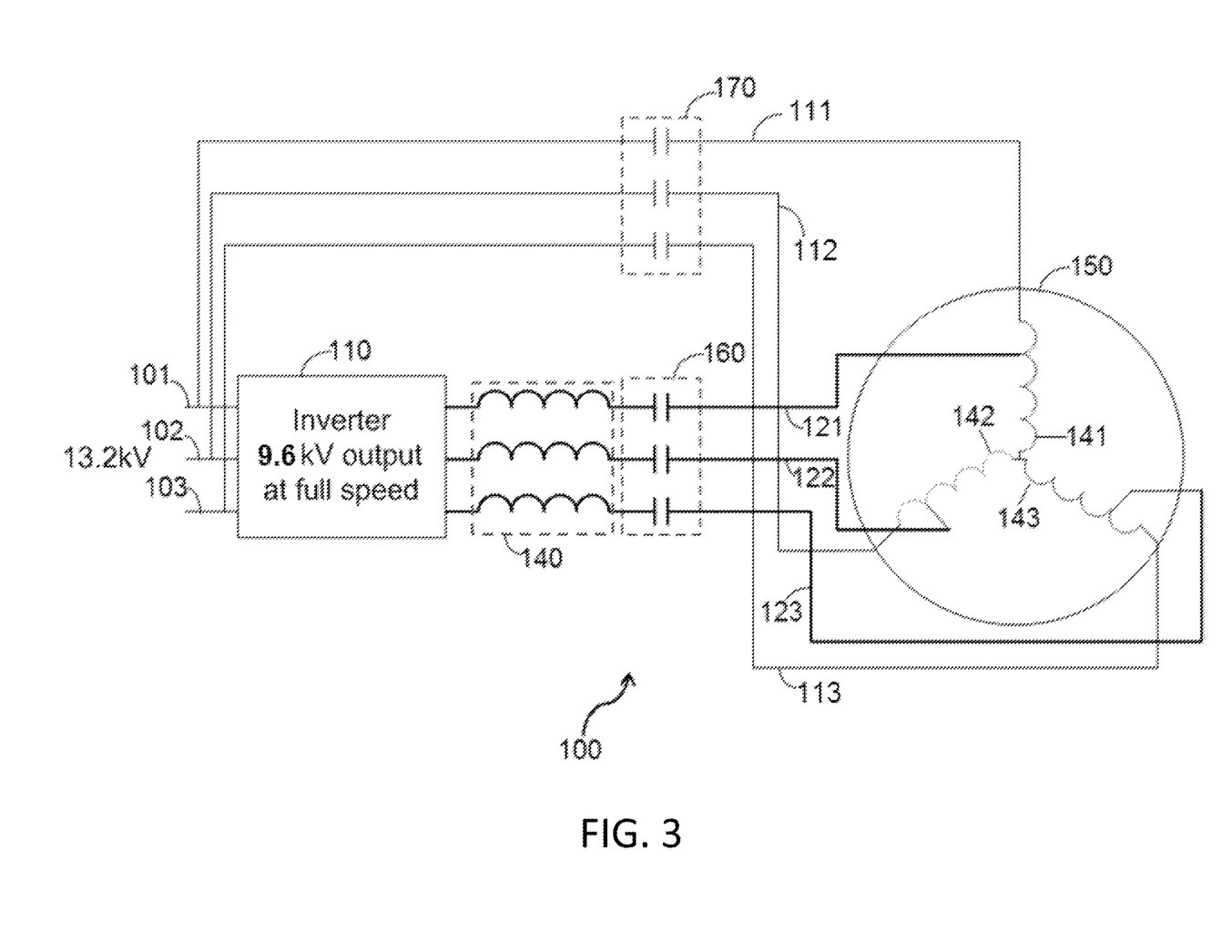
FIG. 3 is a simplified schematic circuit diagram of a system according to an exemplary embodiment of this disclosure.

FIG. 3 shows a simplified circuit diagram of an embodiment of a system 100 according to this disclosure. As illustrated, system 100 comprises three phase power lines 101, 102, 103 that are connected to a variable speed drive 110, which has an output 121, 122, 123 that is lower than the voltage of the three phase power lines 101, 102, 103. In this case, voltage output 121, 122, 123 of the variable speed drive 110 is 9.6 kV, and voltage input 101, 102, 103 of the variable speed drive 110 is 13.2 kV. The output 121, 122, 123 of the variable speed drive 110 optionally passes through a reactor 140 (or output inductor) before connecting to an AC motor 150 at the taps of the stator coils 141, 142, 143 representing each phase. Three phase power lines 111, 112, 113 of higher voltage also connect at the end of stator coils 141, 142, and 143. Also shown in FIG. 3 are a drive switching device 160 connected to voltage output 121, 122, 123 before the point of contact with stator coils 141, 142, 143 and a line switching device 170 connected to the three phase power lines 111, 112, 113 before the point of contact with stator coils 141, 142, 143. Further, stator coils 141, 142, 143 for each phase are represented in simplified form, without showing the first set and second set of coils for each phase, as described in greater detail above.

AC Motor and Method of Manufacture

An additional embodiment of this disclosure includes a method of manufacture comprising configuring a plurality of coils for installation into a stator of a three phase AC motor and an AC motor manufactured by such a method. The plurality of coils consists of three complete sets of coils wherein each complete set corresponds to a phase of a three phase power system. Further, each complete set of coils comprises a first set of coils and a second set of coils, each set of coils having a winding function fundamental component. The first set of coils comprises a plurality of a first group of coils connected together and the second set of coils comprises a plurality of a second group of coils connected together. The first group and the second group together define a subset of the set of coils, the subset representing a pole of a single phase such that a stator with n poles will have n subsets for a complete set of coils representing a single phase of the stator. In addition, each complete set of coils representing a single phase of the stator has a geometric configuration in which the first group of coils of each of the n subsets are connected together in series or parallel or in a combination of series and parallel to form the first set, where each parallel branch has the same number of series connected coils, and the second group of coils of each of the n subsets are connected together in series or parallel or in a combination of series and parallel, with the same number of parallel branches as the first set, and each branch with the same number of series connected coils, to form the second set and the first set is connected in series to the second set. Also, each subset has a geometric configuration comprising a center portion and two outer portions. In some embodiments, the center portion of the subset consists of the first group of coils and the two outer portions of the subset consist of the second group of coils. In other embodiments, the center portion of the subset consists of the second group of coils and the two outer portions of the subset consist of the first group of coils. Further, the winding function fundamental component of the first set of coils is in phase with the winding function fundamental component of the arrangement of coils for each phase such that it provides a configuration that allows the AC motor to transition between the output of the variable speed drive and the higher voltage power system while maintaining the phase angle and amplitude of the fundamental component of the rotating flux during switching.

Additional embodiments of the method of manufacture may further comprise installing the plurality of coils in the stator and/or connecting a variable speed drive to the first set of coils optionally through an output inductor.

AC motor embodiments of the invention also include any such motor manufactured according to any method of manufacture described herein.

Method of Running an AC Motor with Stator Winding Tap

Additional embodiments of this disclosure include a method of running an AC motor, comprising any one or more of: (a) providing an AC motor of this disclosure, (b) connecting the AC motor to a variable speed drive by way of the first set of coils of the AC motor, (c) connecting the AC motor to a power line by way of the series of the second and first sets of coils of the AC motor, (d) starting the AC motor with the variable speed drive, (e) accelerating the AC motor to maximum speed with the variable speed drive, and (f) transferring the motor from the variable speed drive to the power line.

In embodiments, the AC motor is started with the variable speed drive. During the starting sequence, the current will flow only through the first set of coils. The fundamental component of the rotating flux is maintained to its nominal value by a higher magnetizing current provided by the drive. Since the current could be higher than nominal, additional heat may be developed on these coils. However, in most applications the starting sequence is short enough, compared to the motor thermal time constant, to cause an excessive temperature rise. In any case, the additional current that will flow during starting should be factored in during design of the motor so the maximum temperature rise is maintained within the maximum allowed. In a worst case some additional cooling could be used if needed. The winding configuration of the present disclosure may also facilitate a controlled deceleration of the motor when it is transferred from the power system to the variable speed drive.

In additional embodiments of the method of running an AC motor, a drive switching device is connected to the output of the variable speed drive before the first set of coils and a line switching device is connected to the power line before the first end of the second set of coils. In embodiments, the motor is transferred from the variable speed drive to the power line such as would occur after the acceleration according to a switching sequence executed by the drive switching device and the line switching device to turn on an operable connection of the power line to the AC motor and to turn off an operable connection of the variable speed drive to the AC motor. In other embodiments, the motor is transferred from the power line to the variable speed drive such as would occur during deceleration according to a switching sequence executed by the drive switching device and the line switching device to turn off an operable connection of the power line to the AC motor and to turn on an operable connection of the variable speed drive to the AC motor. Further embodiments may provide that the switching sequence is configured according to the phase angle and amplitude of the voltage at the point of connection between the variable speed drive and AC motor and the voltage at the point of connection between the power line and AC motor.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. While embodiments are described in terms of "comprising," "containing," or "including" various components or steps, the embodiments can also "consist essentially of" or "consist of" the various components and steps. Other embodiments of the invention will be apparent to those skilled in the art from consideration of the specification and practice of the invention. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. An AC motor starting method, comprising:
   (a) providing power from a variable speed drive to the AC motor comprising:
   a stator winding with an arrangement of coils per phase;
   each of the arrangements of coils per phase comprises n subsets of coils, wherein n is the number of poles on the stator;
   each subset of coils comprises a first group of coils and a second group of coils, where the first groups of coils are connected to form a first set of coils and where the second groups of coils are connected to form a second set of coils;
   each subset of coils is configured such that the first group of coils is symmetrically disposed relative to a center of the subset and such that the second group of coils is symmetrically disposed relative to the first group of coils;
   a first end of the second set of coils is in operable connection with a power line;
   a second end of the second set of coils is connected in series to a first end of the first set of coils;
   a second end of the first set of coils is connected to a neutral point inside the AC motor;
   a tap is connected to the point where the first and second sets of coils are connected in series and is in operable connection with the variable speed drive;
   (b) accelerating the AC motor to maximum speed using the variable speed drive;
   (c) switching to the power line from the variable speed drive as a power source and continuing to provide power to the AC motor;
   wherein the variable speed drive is configured to provide higher magnetizing and torque producing currents based on a factor defined by a ratio of a winding function fundamental component of the arrangement of coils for each phase and a winding function fundamental component of the first set of coils.

2. The method of claim 1, wherein a drive switching device is connected between the variable speed drive and a point where the first and second sets of coils are connected in series and a line switching device is connected between the power line and the first end of the second set of coils, such that switching of the power source involves turning off an operable connection between the variable speed drive and the AC motor and turning on an operable connection between the power line and the AC motor.

3. The method of claim 1, wherein the switching is performed according to the phase angle and scaled amplitude of the voltage at the point of connection between the variable speed drive and AC motor and the voltage at the point of connection between the power line and AC motor.

4. The method of claim 1, wherein the switching is performed when the phase angle and the amplitude of the voltage between the variable speed drive and the AC motor is the same as that of the voltage between the power line and the AC motor.

5. The method of claim 1, wherein the AC variable speed drive comprises an output inductor in between the variable speed drive and the first set of coils.

6. The method of claim 1, wherein voltage from the variable speed drive is lower than voltage from the power line.

7. The method of claim 1, further comprising switching to the variable speed drive from the power line as a power source and continuing to provide power to the AC motor.

8. The method of claim 1, wherein both the first groups of coils are connected together in series and the second groups of coils are connected together in series.

9. The method of claim 1, wherein:
   the first groups of coils are connected together in parallel, where each parallel branch has the same number of series connected coils; and
   the second groups of coils are connected together in parallel, with the same number of parallel branches as the first set, and each branch with the same number of series connected coils.

10. The method of claim 1, wherein:
    the first groups of coils are connected together in a combination of series and parallel connections, where each parallel branch has the same number of series connected coils; and
    the second groups of coils are connected together in a combination of series and parallel connections, with the same number of parallel branches as the first set, and each branch with the same number of series connected coils.

11. An AC motor comprising:
    a stator winding with an arrangement of coils per phase;
    each arrangement of coils per phase comprises n subsets of coils, wherein n is the number of poles on the stator;
    each subset of coils comprises a first group of coils and a second group of coils, where the first groups of coils are connected to form a first set of coils and where the second groups of coils are connected to form a second set of coils;
    each subset of coils is configured such that the first group of coils is symmetrically disposed relative to a center of the subset or such that the second group of coils is symmetrically disposed relative to the first group of coils;
    a first end of the second set of coils is in operable connection with a power line;
    a second end of the second set of coils is connected in series to a first end of the first set of coils;
    a second end of the first set of coils is connected to a neutral point inside the AC motor;
    a tap is connected to the point where the first and second sets of coils are connected in series and is in operable connection with a variable speed drive;
    wherein the variable speed drive is configured to provide higher magnetizing and torque producing currents based on a factor defined by a ratio of a winding function fundamental component of the arrangement of coils for each phase and a winding function fundamental component of the first set of coils.

12. The motor of claim 11, wherein:
the first groups of coils are connected together in series; and
the second groups of coils are connected together in series.

13. The motor of claim 11, wherein:
the first groups of coils are connected together in parallel, where each parallel branch has the same number of series connected coils; and
the second groups of coils are connected together in parallel, with the same number of parallel branches as the first set, and each branch with the same number of series connected coils.

14. The motor of claim 11, wherein:
the first groups of coils are connected together in a combination of series and parallel connections, where each parallel branch has the same number of series connected coils; and
the second groups of coils are connected together in a combination of series and parallel connections, with the same number of parallel branches as the first set, and each branch with the same number of series connected coils.

15. The motor of claim 11, wherein the second groups of coils are selected such that the fundamental component of the winding function of the first set of coils is capable of being in phase with the fundamental component of the winding function of the arrangement of coils.

16. The motor of claim 11, wherein the stator comprises three arrangements of coils and wherein each arrangement of coils represents a phase of a three phase motor winding.

17. The motor of claim 11, wherein each arrangement of coils comprises a number of subsets of coils equal to a number of poles of the motor.

18. The motor of claim 11, wherein there is no intervening transformer.

* * * * *